(12) United States Patent
Kirchhan

(10) Patent No.: US 9,056,574 B2
(45) Date of Patent: Jun. 16, 2015

(54) BOAT TRAILER EQUIPPED WITH A POWERED BOAT LAUNCH AND RETRIEVAL SYSTEM THAT NEGATES THE SHALLOW ENTRY OF A LAUNCH RAMP

(71) Applicant: James J Kirchhan, Laguna Niguel, CA (US)

(72) Inventor: James J Kirchhan, Laguna Niguel, CA (US)

( * ) Notice: Subject to any disclaimer, the term of this patent is extended or adjusted under 35 U.S.C. 154(b) by 38 days.

(21) Appl. No.: 13/782,067

(22) Filed: Mar. 1, 2013

(65) Prior Publication Data

US 2014/0246842 A1    Sep. 4, 2014

(51) Int. Cl.
*B60P 3/10*    (2006.01)
*B63C 13/00*    (2006.01)

(52) U.S. Cl.
CPC ............... *B60P 3/1075* (2013.01); *B63C 13/00* (2013.01); *B60P 3/1066* (2013.01); *B60P 3/1033* (2013.01)

(58) Field of Classification Search
CPC .... B60P 3/1033; B60P 3/1066; B60P 3/1075; B63C 3/08; B63C 13/00
USPC ............. 280/414.1, 414.3; 414/495; 405/218, 405/219; 114/344
See application file for complete search history.

(56) References Cited

U.S. PATENT DOCUMENTS

| | | | | |
|---|---|---|---|---|
| 2,171,889 A | * | 9/1939 | Payson | 280/47.32 |
| 2,571,361 A | * | 10/1951 | Harmanson | 414/546 |
| 2,919,825 A | | 1/1960 | Hornsby | 114/344 |
| 2,990,966 A | | 7/1961 | Scramm | 114/344 |
| 3,179,439 A | * | 4/1965 | Janeway | 280/124.11 |
| 3,595,598 A | * | 7/1971 | Nuzum | 410/23 |
| 3,689,950 A | * | 9/1972 | Jalowiecki et al. | 114/344 |
| 3,938,829 A | * | 2/1976 | Anderson | 280/414.1 |
| 4,099,279 A | | 7/1978 | Park | 214/84 |
| 4,114,920 A | * | 9/1978 | Boettcher | 280/414.1 |
| 4,221,420 A | * | 9/1980 | Vencill et al. | 410/24 |
| 4,262,922 A | * | 4/1981 | Nelson | 280/414.1 |
| 4,395,185 A | | 7/1983 | Whaley | 414/483 |
| 4,418,959 A | * | 12/1983 | Dunlap | 298/19 V |
| 4,589,814 A | * | 5/1986 | Cates | 414/484 |
| 4,623,161 A | | 11/1986 | Sprague | 280/414.1 |
| 4,641,851 A | | 2/1987 | Knies | 280/414.1 |
| 4,895,387 A | * | 1/1990 | Hawkins et al. | 280/414.1 |
| 4,911,459 A | | 3/1990 | Smyly | 280/414.1 |
| 4,932,830 A | * | 6/1990 | Woodburn | 414/495 |
| 4,974,865 A | * | 12/1990 | Capps | 280/414.1 |
| 4,976,211 A | | 12/1990 | Reinhardt | 114/44 |
| 4,995,629 A | | 2/1991 | Poppell | 280/414.1 |
| 4,997,332 A | * | 3/1991 | Johnson | 414/534 |
| 5,013,206 A | * | 5/1991 | Ernst et al. | 414/483 |
| 5,078,541 A | | 1/1992 | Gola | 405/1 |
| 5,108,248 A | * | 4/1992 | Murrill | 414/462 |
| 5,120,079 A | * | 6/1992 | Boggs | 280/414.1 |

(Continued)

FOREIGN PATENT DOCUMENTS

| | | | | |
|---|---|---|---|---|
| GB | 1086104 | * | 6/1966 | B60P 3/10 |
| GB | 1116946 | * | 6/1968 | B60P 3/10 |

*Primary Examiner* — Anne Marie Boehler
*Assistant Examiner* — Maurice Williams
(74) *Attorney, Agent, or Firm* — Steve Reiss Patent Law Office, P.C.; Steve Reiss

(57) ABSTRACT

A boat trailer is equipped with a powered boat launch and retrieval system that negates the shallow entry of a launch ramp. The system uses a weldment frame, pivotally connected to the trailer frame. The weldment frame works in combination with a powered cylinder, gravity's effect on the weldment frame and the hull of the boat to automatically release the boat into the water or automatically retrieve the boat from the water.

4 Claims, 3 Drawing Sheets

(56) References Cited

U.S. PATENT DOCUMENTS

| | | | | |
|---|---|---|---|---|
| 5,152,656 A * | 10/1992 | Potter | | 414/462 |
| 5,165,706 A * | 11/1992 | Fond | | 280/414.1 |
| 5,183,282 A | 2/1993 | Smyly | | 280/414.1 |
| 5,190,330 A * | 3/1993 | Dunham | | 294/191 |
| 5,380,143 A | 1/1995 | Mohan | | 414/495 |
| 5,468,115 A * | 11/1995 | Alvis | | 414/556 |
| 5,480,174 A * | 1/1996 | Grenier | | 280/414.1 |
| 5,511,928 A | 4/1996 | Ellis | | 414/462 |
| 5,653,566 A * | 8/1997 | Williams et al. | | 414/462 |
| 5,662,453 A * | 9/1997 | Gerstner et al. | | 414/812 |
| 5,772,388 A * | 6/1998 | Clark | | 414/484 |
| 6,003,888 A * | 12/1999 | Godbersen | | 280/124.169 |
| 6,152,065 A * | 11/2000 | Gronstrand | | 114/365 |
| 6,182,597 B1 | 2/2001 | Maxwell | | B63C 3/08 |
| 6,203,264 B1 * | 3/2001 | Combs, Sr. | | 414/483 |
| 6,217,053 B1 * | 4/2001 | Forsythe et al. | | 280/414.3 |
| 6,341,793 B2 | 1/2002 | Braun | | 280/414.1 |
| 6,402,445 B1 * | 6/2002 | Smiley | | 410/77 |
| 6,447,237 B1 * | 9/2002 | Haynes | | 414/483 |
| 6,575,487 B1 | 6/2003 | Krause | | 280/414.1 |
| 6,648,578 B1 * | 11/2003 | Rouse | | 414/482 |
| 6,719,317 B1 * | 4/2004 | Grovender et al. | | 280/414.1 |
| 7,143,713 B1 * | 12/2006 | Richardson et al. | | 114/344 |
| 7,237,788 B1 * | 7/2007 | Norbits | | 280/414.1 |
| 7,410,031 B2 * | 8/2008 | Jensen | | 182/127 |
| 7,455,310 B2 * | 11/2008 | Hyslop | | 280/414.1 |
| 7,628,564 B2 | 12/2009 | Krause | | 405/3 |
| 7,874,568 B1 * | 1/2011 | Pelligrino | | 280/414.1 |
| 8,091,912 B2 | 1/2012 | Hyslop | | 280/414.1 |
| 8,152,100 B2 * | 4/2012 | Nicholas et al. | | 244/110 R |
| 8,267,030 B1 | 9/2012 | McHugh | | 114/221 |
| 8,590,916 B2 * | 11/2013 | Velton | | 280/414.1 |
| 2008/0014053 A1 * | 1/2008 | Healy | | 414/138.8 |
| 2010/0289247 A1 * | 11/2010 | Hyslop | | 280/414.1 |
| 2010/0295298 A1 * | 11/2010 | Haumont et al. | | 285/412 |
| 2010/0296874 A1 * | 11/2010 | Woodhouse | | 405/219 |
| 2011/0008139 A1 * | 1/2011 | Hey et al. | | 414/495 |
| 2011/0132165 A1 * | 6/2011 | Dale | | 83/169 |
| 2011/0206488 A1 * | 8/2011 | Windsor et al. | | 414/462 |
| 2012/0091688 A1 * | 4/2012 | Fink | | 280/414.1 |
| 2013/0147156 A1 * | 6/2013 | Velton | | 280/414.1 |

* cited by examiner

BOAT TRAILER EQUIPPED WITH A POWERED BOAT LAUNCH AND RETRIEVAL SYSTEM THAT NEGATES THE SHALLOW ENTRY OF A LAUNCH RAMP

BACKGROUND OF THE INVENTION

1. Field of the Invention

The field of the invention lies within the art of launching a trailerable boat. The specific field is with regard to trailerable ocean boats incorporating a deep "V" with a steep forward entry. With this hull design the bow is forward of the buoyancy level of the typical 12½ percent descent of launch ramps, making the launch and or retrieval difficult without subjecting the tow vehicle, boat, or even the launch facilities to potential damage.

2. Prior Art

The prior art consists of, and includes the designs of trailers with one or more hinge points to break the trailer horizontal beam to enable a lower trailer to hull support position to aid floatation. Another describes a telescopic center beam that when extended, allows a deeper launch, allowing the boat to float off the trailer. Another describes a device to raise and lower the trailer tongue to aid the launch.

The inventor has found, that when the stern, of a trailerable boat becomes buoyant, due to launch ramp depth, that adding a rotational component, of a replicated, sea swell type motion to mechanically lift the bow, aft or forward in the longitudinal axis, creates the equivalency of total buoyancy enabling a safe successful launch, and or retrieval, without compromise.

SUMMARY OF THE INVENTION

In summation, this invention complements a transport trailer, specifically designed to support a boat hull, by installing a powered pivotal support system to the forward trailer frame, to mechanically lift the trailer bound bow, of a boat, into, and out of, deeper buoyant water.

DESCRIPTION OF THE DRAWINGS

The invention will be more clearly understood by reference to the description below taken in conjunction with the accompanying drawings wherein.

DESCRIPTION OF THE PREFERRED EMBODIMENTS

Figure 1:
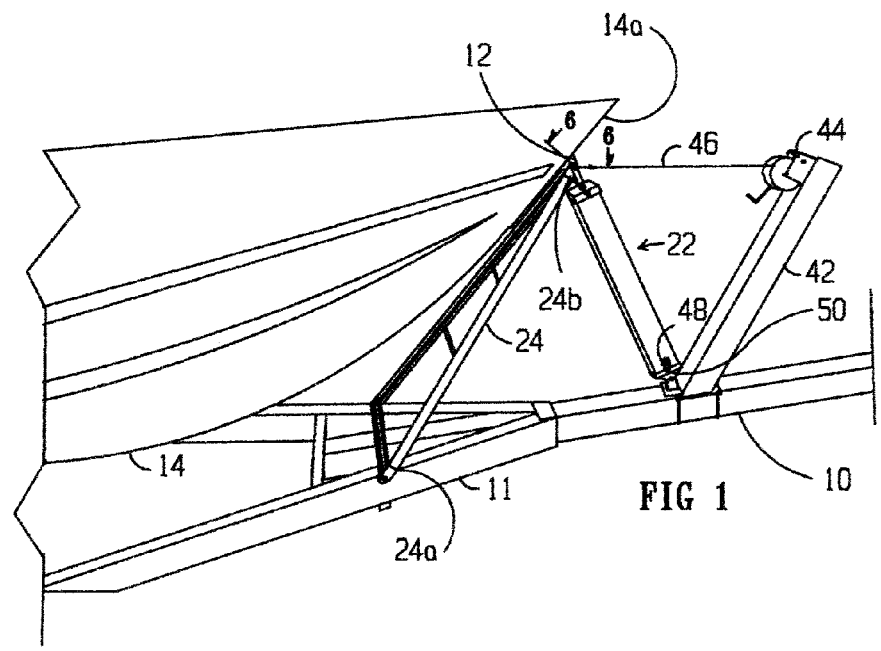
FIG. 1 shows a perspective view of a transport trailer with boat hull, and powered pivotal launch and retrieval/positioning system in the transport mode.

Looking at FIG. 1, it can be seen that a boat 14 is mounted in a stowage position aboard a trailer frame 11 of a boat transport trailer 10. Looking more particularly at the boat trailer 10, it can be seen that the bow 14a of the boat is secured to the boat trailer 10 from the bow eye 12 location. Looking more particularly at FIG. 6, a view along line 6-6 of FIG. 1, it can be seen the bow eye 12 is attached to the bow 14a with two fastening studs 15 that are respectively threaded into the bow eye 12, and secured with hex nuts 18 bearing on washer 20 inside of the boat hull 14.

Figure 3:
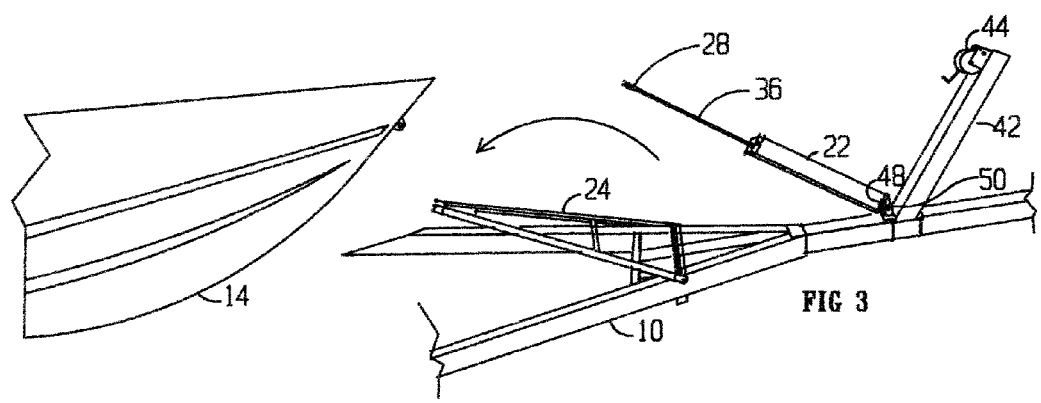
FIG. 3 shows a perspective view of the powered pivotal launch and retrieval/positioning system as launched.
Figure 4:
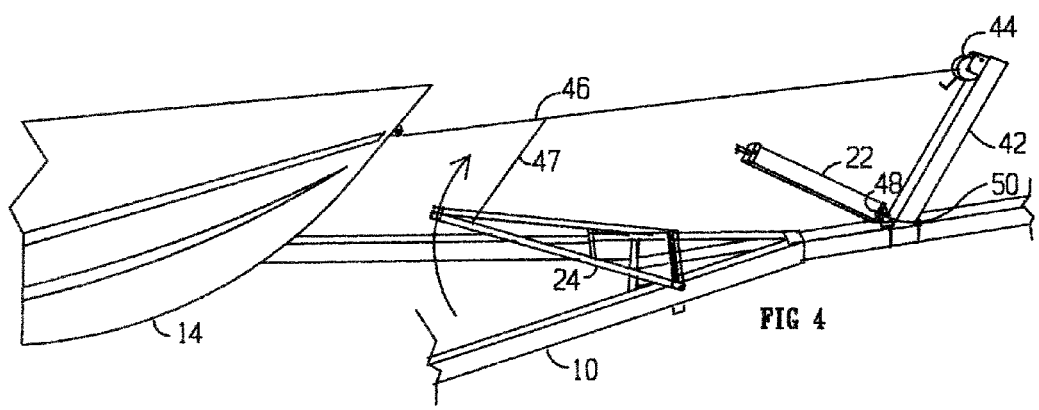
FIG. 4 shows a perspective view of the hull being positioned for retrieval.
Figure 5:
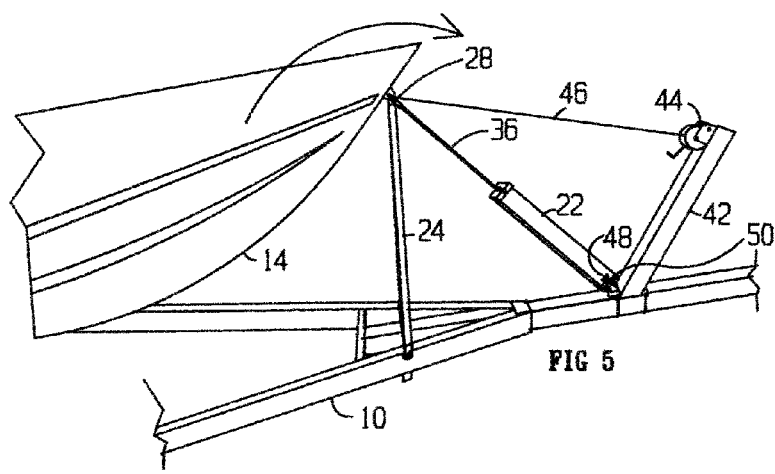
FIG. 5 shows a perspective view of the "A" frame weldment in the top dead center retrieval mode.

Looking at FIG. 1 it can be seen that trailer 10 includes a pivotable frame 24, which may sometimes be referred to as a weldment. Frame 24 has a wide end 24a and a narrow end 24b (wide and narrow relative to each other), and when frame 24 is in the form of an A-frame, the narrow end 24b may be referred to as the apex end. The narrow end 24b of the frame includes connector 25 (FIG. 2) for securing the bow eye 12 to the trailer 10. The wide end 24a of a frame 24 is pivotally attached to a portion of the trailer frame 11 towards the front of the trailer 10. The frame 24 may pivot from a first position, angled towards the front of the trailer 10 (FIG. 1), to a generally vertical position known as "top dead center" or "TDC" (FIGS. 2, 5), to a second position, angled towards the rear of the trailer 10 (FIG. 3). In the alternative, the frame 24 may pivot from the second position, angled towards the rear of the trailer 10 (FIG. 4), to the "top dead center" or "TDC" positions (FIGS. 2, 5), to the first position, angled towards the front of the trailer (FIG. 1).

The front of the trailer 10 includes a motive power source for pivoting the frame 24 from the first position towards the second position and from the second position towards the first position. To pivot the frame 24 from the first position towards the second position, the motive power source includes a powered cylinder assembly 22, further described below, and having an extendible push rod 36 supporting a push fork 28 on the push rod 36's free end. To pivot the frame 24 from the second position towards the first position, the motive power source includes a winch 44, further described below.

Looking at FIG. 1, it can be seen that the powered cylinder assembly 22 forms a strut to a quadrilateral formed by trailer 10, frame 24, winch support 42, and winch belt assembly 46, to prevent vertical movement of the bow eye 12. Powered cylinder assembly 22 may include a pressurized fluid supply, such as a portable air supply 50, pneumatically connected to a control regulator 48. The gas output of the regulator 48 is connected to a pressure cylinder 23. By adjusting regulator 48, pressure cylinder 23 can be used to extend push rod 36 out of pressure cylinder 23 to rotate the frame 24 towards the second position (see arrow in FIG. 3) and its TDC position as described below.

Looking at FIG. 1 it can be seen that the frame 24, powered cylinder assembly 22 with push rod 36, and the trailer frame, form a triangular support apex.

Figure 6:
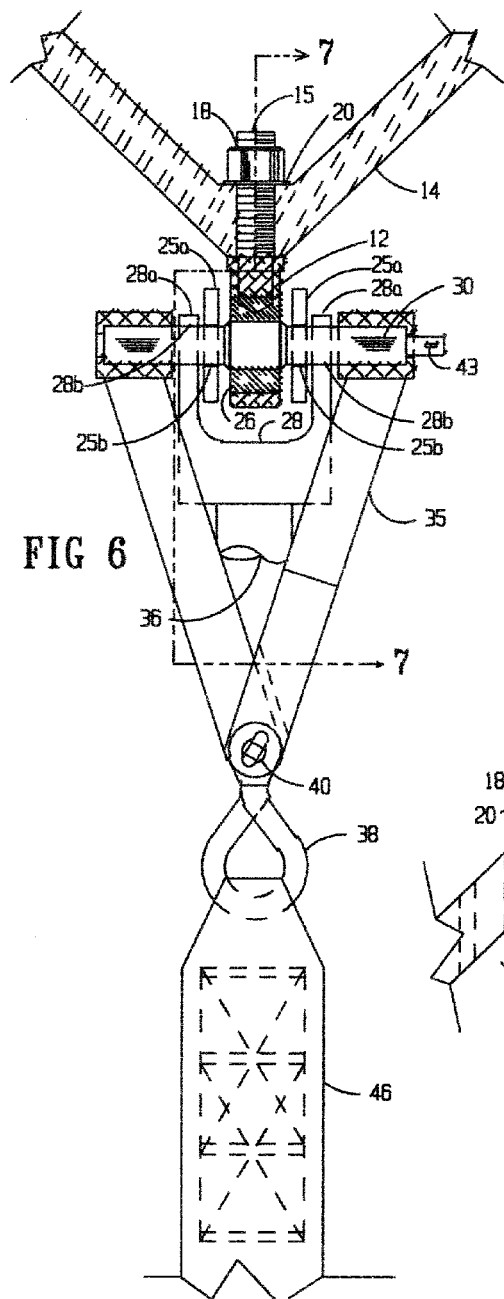
FIG. 6 shows a detailed plain cross sectional view, 6-6 of FIG. 1.
Figure 7:
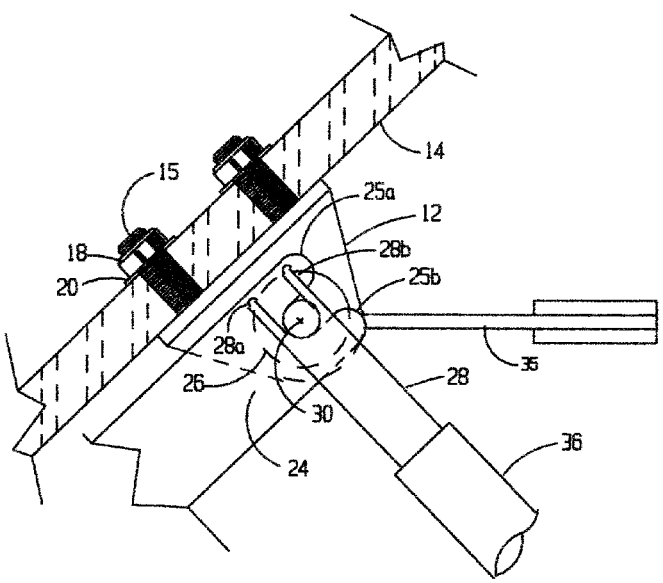
FIG. 7 shows a sectional view along and in the direction of lines/arrows 7-7 of FIG. 6.

Looking at FIG. 6 and FIG. 7 it can be seen that connector 25 comprises a bilateral connector fork having spaced apart connector fork arms 25a. Each connector fork arm 25a has a connector fork slot 25b. The bow eye 12 is positioned between the connector fork arms 25a. Looking at FIG. 6 it can be seen, that a horizontal push/pull bar 30 is centered within the bow eye 12 and fixed within the bow eye 12. A resilient damping material 26 eliminates chatter during towing, to mediate shock, and to evenly distribute loads during rotation. Horizontal push/pull bar 30, is received in the connector fork slots 25b in the connector fork arms 25a to secure the boat 14 to the frame 24 via the bow eye 12.

Similarly, push fork 28, connected to the free end of rod 36 of the powered cylinder assembly 22, comprises a bilateral push fork having spaced apart push fork arms 28a. Each push fork arm 28a has a push fork slot 28b therethrough; the push fork slots 28b being coaxial. To connect the boat 14, the frame 24, and the push fork 28, as shown in FIG. 6 and FIG. 7, the bow eye 12 is positioned between the connector fork arms 25a and the connector fork arms 25a positioned between the push fork arms 28a. The horizontal push/pull bar 30, is received in the slots 25b, 28b in the two sets of arms 25a, 28a, and the bow eye 12 to secure the boat 14 to the frame 24 and the push fork 28.

Figure 2:
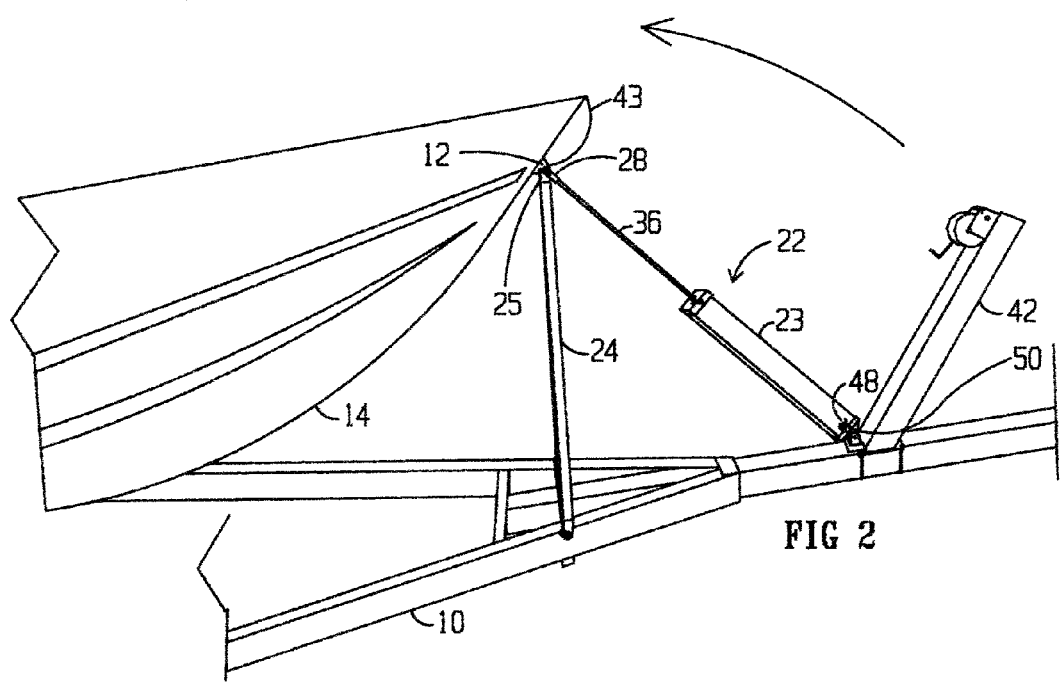
FIG. 2 shows a perspective view of the powered pivotal launch and retrieval/positioning system in the launch mode.

Looking at FIG. 2, it can be seen that the triangular yoke 35, and the winch belt 46 has been removed from the horizontal push/pull bar 30.

To prevent unintentional loss of the push/pull bar 30 should it become unfixed from its position in bow eye 12, a security lanyard (not shown) can be secured to port side slot 43 of the horizontal push/pull bar 30.

In a first mode of operation, the boat 14 is moved from a stowage position (FIG. 1) on the trailer 10 and released into the water. In particular, as shown in FIG. 2, pressure cylinder assembly 22 is pressurized by control regulator 48, connected to portable air supply 50. This causes pressure cylinder 23 to extend outwardly rod 36, causing the frame 24 to move from the first position, towards the TDC position, moving the boat upwardly and away from the front of the trailer, towards the rear of the trailer. When frame 24 reaches and passes TDC, push/pull bar 30 the boat 14, the frame 24, and the push fork 28 separate from each other via slots 25b, 28b. However, as shown by the arrow in FIG. 3, gravity will take over and act on the bow 14a and frame 24 and the bow 14a and frame 24 will continue to fall rearward where, looking at FIG. 3, it can be seen the powered cylinder 23, the frame and the hull completely separate, by the continued downward and rearward motion of the bow 14a and frame 24, strictly due to gravitational assist. The boat 14 is thus released into the water.

In a second mode of operation, the boat 14 is to be retrieved from the water and moved into the stowage position on the trailer 10. In particular, looking at FIG. 4, it can be seen that the trailer 10 and boat hull 14 are in the retrieval mode. As shown in FIG. 6, a two piece triangular yoke 35, has been attached to the ends of horizontal push/pull bar 30, the winch belt 46 has, been joined to the yoke by shackle 38, and secured with shackle pin 40. Looking more particularly at FIG. 4 it can be seen a lift strap 47 is attached to winch belt 46, and to the frame 24, that during retrieval, retraction of belt 46 and strap 47 provide an upward lift of the connector fork 25 thereof to receive the horizontal push/pull bar 30 within slots 25b (see arrow). Continued advancement will enable the start of the longitudinal lift of bow 14a and frame 24 toward the TDC position. Looking at FIG. 5 it can be seen, that the push yoke 28, has been extended, by applying pneumatic air to pressure cylinder 23, to a predetermined value, and horizontal push/pull bar 30 is received within slots 28b. As the bow 14a, is lifted longitudinally upward and forward, by winch 44, the increased cylinder pressure is released by the pressure regulator 48. When the frame 24, has advanced passed TDC by winch belt 46, connected to winch 44, the effects of gravity assist will act on the bow 14a and the frame 24 to complete the controlled rotation (see curved arrow in FIG. 5) of the frame 24 to join the apex position with pressurized cylinder 23, whereby bow 14a automatically drops into the stowage position on the trailer 10. Looking at FIG. 1 it can be seen that the taunt winch belt 46 completes the quadrilateral structure for the towing/storage position.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

I claim:

1. A boat trailer, comprising:
   a trailer frame having a front end and a rear end;
   a frame having a wide end and a narrow end, the wide end pivotally attached to a portion of the trailer frame towards the front end of the trailer, the frame being pivotable between a first position and a second position; the narrow end of the frame having a bilateral fork attached thereto for connecting the frame to a bow eye of a boat a horizontal push/pull bar centered within the bow eye;
   a power cylinder assembly with a rod, and a push fork connected to the rod;
   wherein the push/pull bar is captured between the bilateral for and the push for in the first position;
   the trailer using gravity assist in launching the boat, connected to the frame, from a stowage position on the trailer into the water, by the trailer causeing the frame to move:
   (a) from the first position angled towards the front of the trailer, towards a top dead center(TDC) position, the frame moving the bow upwardly and away from the front of the trailer and towards the rear of the trailer; and
   (b) passed the TDC position and then towards the second position, angled towards the rear of the trailer, by gravity acting on the bow and the frame, to thereby release the boat into the water.

2. The boat trailer according to claim 1, whereby:
   the trailer using gravity assist in retrieving the boat from the water and loading the boat into the stowage position on the trailer, by the trailer causing the frame to move:
   (a) from the second position towards the TDC position, moving the bow eye upwardly and away from the rear of the trailer, towards the front of the trailer;
   (b) passed the TDC position and then towards the first position by gravity acting on the bow and the frame, thereby automatically pulling the boat out of the water and into the stowage position on the trailer.

3. The boat trailer of claim 2, wherein:
   the power cylinder is used to move the frame from the first position towards the TDC position moving the bow upwardly and away from the front of the trailer towards the rear of the trailer; and a winch is used to move the frame from the second position towards the TDC position moving the bow upwardly and away from the rear of the trailer towards the front of the trailer.

4. The boat trailer of claim 2, wherein the frame comprises and A-frame; the wide end of the A-frame pivotally attached to a portion of the trailer frame towards the front of the trailer.

* * * * *